Aug. 8, 1950  E. BARKER  2,518,216
SWIVEL JOINT
Filed March 18, 1948

INVENTOR.
*Eugene Barker.*
BY
*Cabell, Mahoney & Miller*
ATTORNEYS

Patented Aug. 8, 1950

2,518,216

UNITED STATES PATENT OFFICE 2,518,216

SWIVEL JOINT

Eugene Barker, Columbus, Ohio, assignor to The Jaeger Machine Company, Columbus, Ohio, a corporation of Ohio Application March 18, 1948, Serial No. 15,567

5 Claims. (Cl. 285—97.3)

My invention relates to a swivel joint. It has to do, more particularly, with a fluid-tight joint for connecting a rotatable unit with a non-rotatable unit and for conducting fluid, such as hydraulic fluid, from one of such units to the other.

One of the objects of my invention is to provide a very simple joint of the type indicated which is composed of a minimum number of parts that are simple to make, which is of such a nature that the parts can be assembled easily and be located properly and accurately relatively or can be separated easily for disassembling, and which is so designed that the parts thereof will not be subjected to excessive friction and wear.

Another object of my invention is to provide a swivel joint of the general type indicated which is composed of relatively rotatable parts but which is still fluid-tight under all operating conditions without interfering with the free rotation of such parts.

Still another object of my invention is to provide a fluid-tight swivel joint of the type indicated wherein the relatively rotatable parts are sealed by a novel arrangement of packing material.

A further object of my invention is to provide a swivel joint of the type indicated in the preceding paragraph wherein the packing material is so arranged as to prevent leakage in either direction past such material regardless of pressure conditions on the opposite sides of the material.

Another object of my invention is to provide a swivel joint of the type indicated having a novel arrangement of anti-friction bearing which is so arranged that it will receive the thrust created by fluid pressure within the joint but which is of such a design that friction will be reduced to a minimum.

Still another object of my invention is to provide a swivel joint having a bearing of the type indicated above with means associated with the bearing for effectively lubricating it.

Various other objects will be apparent from the drawing and the following description.

The preferred embodiment of my invention is illustrated in the accompanying drawing wherein similar characters of reference designate corresponding parts and wherein.

Figure 1:
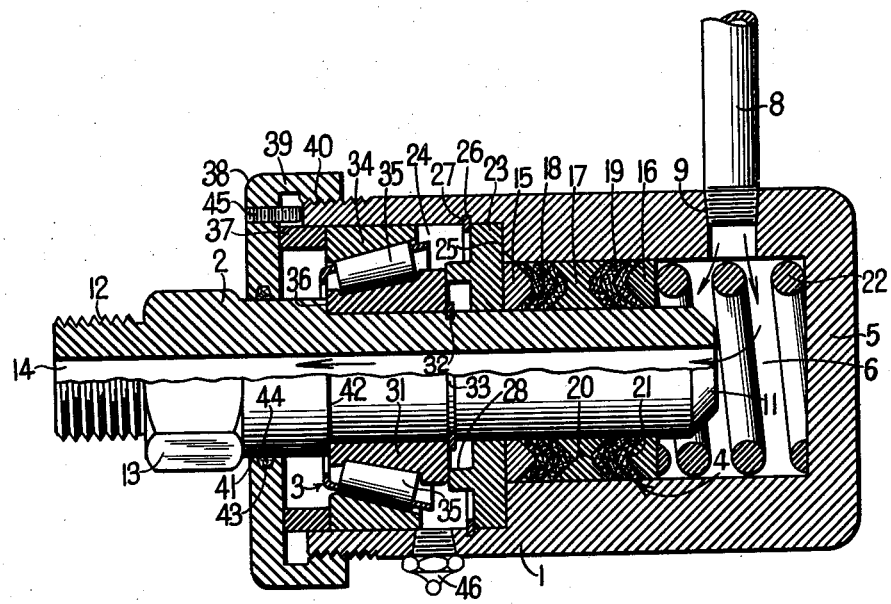
Figure 1 is a view mainly in longitudinal section of the swivel joint made according to my invention.
Figure 2:
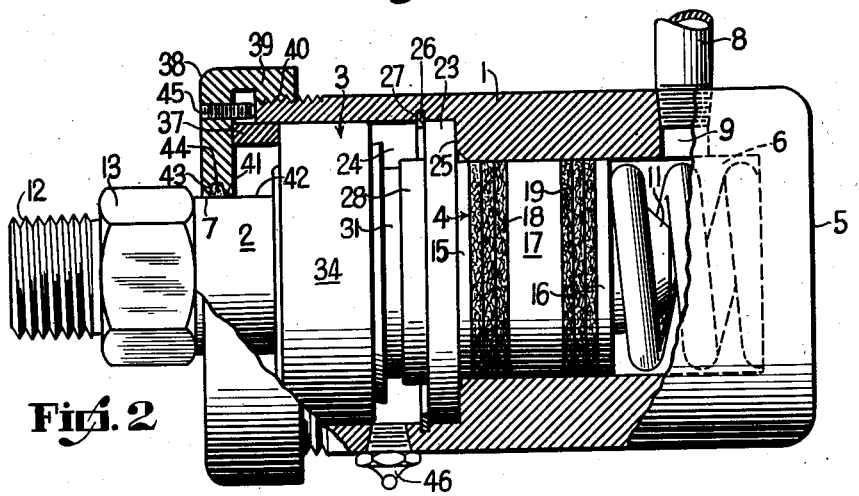
Figure 2 is a similar view but showing certain of the parts in elevation rather than in section.
Figure 3:
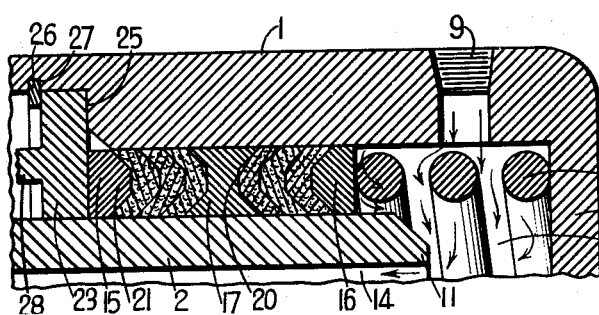
Figure 3 is a detail in section illustrating mainly the packing arrangement.

With reference to the drawing, I have illustrated my swivel joint as comprising mainly a stationary housing 1, a tube 2 rotatably mounted in the housing, an anti-friction bearing unit 3 disposed between the housing 1 and tube 2 and an adjacent packing unit 4 also disposed between the relatively rotatable members 1 and 2.

The housing 1 is shown as being of substantially cylindrical form with one end closed by the wall 5 to form a chamber 6 for receiving fluid and with the other end open, as indicated at 7, to permit insertion of the tube 2. Fluid enters the chamber 6 through a conduit 8 threaded into a bore 9 in the wall of the housing 1 adjacent the closed end thereof.

The member 2 is of substantially tubular form and is inserted through the open end 7 of the housing 1 into such housing with its inner end 11 spaced from the wall 5 of the housing and with its outer end projecting from the housing. The extreme outer end of the tube 2 is provided with a threaded coupling 12 by means of which the tube may be connected to a suitable rotating unit adapted to receive fluid, for example, a rotating shaft. The coupling 12 will thread into a suitable socket provided on such unit and the connection may be made or broken easily due to the provision of the nut portion 13 formed on tube 2 adjacent the coupling 12. It will be noted that a fluid-conducting bore 14 extends completely through tube 2.

The packing unit 4 is disposed adjacent the inner end of the tube 2. This unit comprises the two left and right adapter rings 15 and 16 and a center adapter ring 17, fitted within chamber 6 and around tube 2, with a plurality of packing rings 18 disposed between adapter rings 15 and 17 and with a plurality of similar packing rings 19 disposed between the adapter rings 16 and 17. It will be noted that the adapter ring 17 has oppositely facing grooves 20 formed in its opposite surfaces and which are of substantially V cross-section. The adapter rings 15 and 16 are provided with oppositely facing ribs 21 which are of substantially V cross-section and are complemental to the grooves 20. The packing rings 18 and 19 constitute chevron packing and it will be noted that the packing 18 and the packing 19 will extend reversely, the packing 18 facing or pointing to the right and the packing 19 facing or pointing to the left. Obviously, this results from the relative arrangement of the adapter rings 15, 16 and 17 and the cross-sectional form of such rings. With this particular arrangement of chevron packing, as will later appear more fully, there will be no danger of leakage of fluid in either direction.

In order to keep the packing material tightly compressed between the adapter rings, which are axially movable relative to members 1 and 2, so as to ensure tight contact of the packing material with the wall of the chamber 6 in the housing and with the outer surface of the tube 2, I provide the compression spring 22. This spring bears against the outer surface of the right-hand adapter ring 16 and with the wall 5 of the housing. It forces the ring 16 towards the ring 17 and the ring 17 towards the ring 15. Movement to the left of ring 15 is limited by a spacer ring 23 with which the ring 15 engages. This spacer ring 23 is fitted around tube 2 and is associated with the bearing unit 3, being disposed within the enlarged bearing receiving chamber 24 formed at the left-hand end of the housing 1. The ring 23 is axially movable relative to member 2 but is held seated on a shoulder 25 formed at the inner end of the chamber 24 between such chamber and the chamber 6 by means of a retaining ring 26 which expands outwardly into groove 27 in the wall of chamber 24. The opposite surface of the spacer 23 is provided with an annular axially projecting rib 28 which projects towards bearing unit 3.

The rib 28 contacts with the inner end of the inner bearing race 31 of the roller bearing disposed in the chamber 24, the race 31 being fitted around tube 2. A retaining ring 32 is carried by the tube 2 being contracted into an annular groove 33 formed in the outer surface thereof. This retaining ring 32 engages the inner end of the inner race 31 and prevents axial outward movement of tube 2 relative to the race 31. The bearing also includes an outer race 34 fitted into the chamber 24, tapered rollers 35 being disposed between the inner race 31 and the outer race 34. The outer end of the inner race 31 engages a shoulder 36 formed on the outer surface of tube 2. Thus, the inner race 31 is disposed on tube 2 between the shoulder 36 and the ring 32 and, consequently, axial movement in either direction of member 2 relative to the inner race 31 is precluded.

A spacer ring 37 is fitted within the outer end of the chamber 24 for axial movement in and out of this chamber. This spacer ring 37 engages the outer end of the outer race 34. A retaining cap 38 is provided with a flange 39 which is threaded on the threaded outer surface 40 at the extreme end of housing 1. This cap 38 is provided with a central opening 41 in which the enlarged portion 42 of the tube 2 is disposed for axial movement. The edge of the opening 41 is provided with an annular groove 43 which receives packing 44. This packing fits tightly around the enlarged portion 42 of the tube 2 and provides a substantially fluid-tight seal at this joint. The cap 38 is free to rotate relative to the tube 2 so that it can be adjusted axially on the housing 1 and the inner surface of the cap engages the outer edge of the spacer ring 37. The cap may be held in any position to which it is rotatably adjusted by means of a set screw 45 extending through the cap and engaging the outer edge of the housing 1.

I provide means for lubricating the bearing unit 3 and the associated parts. This means comprises a pressure lubricant fitting 46 which is mounted in the wall of the housing 1 and communicates with the chamber 24. Thus, lubricant can be supplied into the chamber 24 and will lubricate the bearing 3 and associated parts. It will be prevented from escaping between the cap 38 and tube 2 by the packing 44.

In assembling this unit, the spring 22 and all the parts of the packing unit 4 are positioned in the chamber 6 of the housing 1. The spacer ring 23 is then positioned in the housing in contact with shoulder 25 and is held in such position by the retaining ring 26. The cap 38 is first positioned on the enlarged portion 42 of the tube 2, the spacer ring 37 is next positioned on the tube adjacent the cap and then the bearing unit 3 is mounted on the tube and is held in place by the retaining ring 32. The tube 2 with the bearing 3, the ring 37, and the cap 38 carried thereby, is then inserted in the housing 1 so that its inner end extends into the packing unit 4. The cap 38 is then threaded on the housing 1 to move the ring 37 within the chamber 24 so that it engages the outer race 34 and moves the tube 2 and the bearing 3 carried thereby axially into housing 1 until the inner race 31 contacts with the rib 28 on the spacer ring 23. The screw 45 is then tightened to hold the cap 38 in adjusted position.

Fluid pressure developed within the chamber 6 will tend to exert a thrust to the left on the packing unit 4 and this thrust will be taken by the ring 23. In fact, there will be a tendency to move the entire housing 1 to the left. However, this thrust will be transmitted to the inner race 31 of the bearing unit 3. Since the outer bearing race 34 is prevented from moving to the left by the ring 37, the thrust will be transmitted to the outer race also by the rollers 35. However, because this bearing is of the roller type, this thrust can be absorbed by the bearing unit without undue friction.

The swivel joint may be disposed between a stationary unit and a rotatable unit of any type and can be used for making a fluid-tight connection between such units so as to conduct fluid from one unit to the other. For example, the joint may be used in a hydraulic circuit used for operating hydraulic clutches and brakes. Ordinarily, hydraulic liquid under pressure will enter through the conduit 8 into the chamber 6 and pass outwardly through the bore 14 in the tube 2, the housing 1 being stationary and the tube 2 rotating. With this pressure condition in chamber 6, there is a tendency for the pressure developed within chamber 6 to aid the spring 22 in keeping the packing compressed. If any fluid does pass beyond the adapter ring 16, it will merely serve to force the chevron packing 19 outwardly more firmly into contact with the wall of the chamber 6. If a vacuum condition is created within chamber 6, the packing is still maintained in proper position by the spring 22. This vacuum condition may result from sudden operation of the actuating cylinder. Vacuum within the chamber 6 would tend to unseat the outer edges of the packing 19 from the wall of the chamber 6. However, due to the reverse arrangement of the packing 18, the vacuum force would tend to more firmly seat the outer edges of such packing against the wall of chamber 6. Thus, due to the reverse arrangement of the chevron packing 18 and 19, a fluid-tight seal will result regardless of whether there is pressure or vacuum within chamber 6.

It will be apparent from the above description that I have provided a novel type of swivel joint. The joint is simple, composed of a few parts which can be made easily, is of such a nature that the parts will not wear excessively and can be assembled and disassembled readily. A fluid-tight seal is ensured under all operating conditions and a minimum amount of friction is developed within the joint.

Various other advantages will be apparent.

Having thus described my invention, what I claim is:

1. A swivel joint comprising a substantially cylindrical housing having one end closed and the other end open, a substantially tubular member having one end inserted into the open end of the housing and positioned so that its inner end is spaced from the closed end of the housing, the closed inner end of the housing providing a chamber for receiving fluid under pressure, said tubular member having a passageway extending therethrough which communicates at its inner end with said chamber, a packing unit surrounding said tubular member and fitting within said housing chamber to prevent passage of fluid therebetween without interfering with the relative rotation thereof, said unit including a central adapter ring fitted around said tubular member and within said chamber and two end adapter rings fitted around said tubular member and within said chamber, all of said rings being axially movable relative to said tubular member and said housing, each end adapter ring having a rib of V-form facing towards a groove of V-form in the adjacent surface of the central adapter ring, the rib on the one end adapter ring facing towards the rib on the other end adapter ring, compressible packing between each end adapter ring and the central adapter ring and adapted to be gripped therebetween so as to be maintained in chevron shape, said adapter rings serving to provide two groups of chevron packing at opposite sides of the central adapter ring with the packing of each group having its groove side outwardly in order to prevent passage of fluid under pressure outwardly from said chamber along the tubular member and wall of the chamber and in order to prevent leakage of air inwardly along the tubular member and wall of the chamber whenever a vacuum is created within the chamber, a compression spring disposed within said chamber in surrounding relationship to the extreme inner end of said tubular member in engagement with the closed end of the housing and the innermost end adapter ring so as to force such ring towards the outermost adapter ring, a thrust collar for limiting outward axial movement of the outermost end adapter ring secured in fixed position at the inner end of a counterbore formed within the outer portion of the housing but fitted on the tubular member for relative axial movement, an anti-friction bearing disposed within said counterbore between said tubular member and said housing, said bearing including an inner race held in fixed position on the exterior of said tubular member and with which said thrust collar engages, said bearing also including an outer race mounted within the counterbore for axial movement therewithin, tapered rollers between said inner and outer races with their wider ends inwardly and with their axes extending angularly in the direction of thrust of said thrust collar toward the axis of said bearing, a spacer sleeve fitted within the counterbore for axial movement therein which engages the outer end of said outer bearing race and extends beyond the outer end of the housing, and a cap threaded on the outer end of said housing and fitted on the tubular member for relative axial movement, said cap engaging the outer end of said spacer sleeve.

2. A swivel joint comprising a substantially cylindrical housing having one end closed and the other end open, a substantially tubular member having one end inserted into the open end of the housing and positioned so that its inner end is spaced from the closed end of the housing, the closed inner end of the housing providing a chamber for receiving fluid under pressure, said tubular member having a passageway extending therethrough which communicates at its inner end with said chamber, a packing unit surrounding said tubular member and fitting within said housing chamber to prevent passage of fluid therebetween without interfering with the relative rotation thereof, said unit including end adapter rings which are axially movable relative to said tubular member and said housing and which have compressible packing therebetween, a compression spring disposed within said chamber in surrounding relationship to the extreme inner end of said tubular member in engagement with the closed end of the housing and the innermost end adapter ring so as to force such ring towards the outermost adapter ring, a thrust collar for limiting outward axial movement of the outermost end adapter ring secured in fixed position within the outer portion of the housing but fitted on the tubular member for relative axial movement, an anti-friction bearing disposed within the outer end of the housing between said tubular member and said housing, said bearing including an inner race held in fixed position on the exterior of said tubular member and with which said thrust collar engages, said bearing also including an outer race mounted within the housing for axial movement therewithin, tapered rolling for axial movement therewithin, tapered rollers between said inner and outer races with their wider ends inwardly and with their axes extending angularly in the direction of thrust of said thrust collar toward the axis of said bearing, a spacer sleeve fitted within the outer end of the housing for axial movement therein which engages the outer end of said outer bearing race and extends beyond the outer end of the housing, and a cap mounted on the outer end of said housing for axial adjustment and fitted on the tubular member for relative axial movement, said cap engaging the outer end of said spacer sleeve.

3. A swivel joint comprising a substantially cylindrical housing having one end closed and the other end open, a substantially tubular member having one end inserted into the open end of the housing and positioned so that its inner end is spaced from the closed end of the housing, the closed inner end of the housing providing a chamber for receiving fluid under pressure, said tubular member having a passageway extending therethrough which communicates at its inner end with said chamber, a packing unit surrounding said tubular member and fitting within said housing chamber to prevent passage of fluid therebetween without interfering with the relative rotation thereof, said unit including a central adapter ring fitted around said tubular member and within said chamber and two end adapter rings fitted around said tubular member and within said chamber, all of said rings being axially movable relative to said tubular member and said housing, each end adapter ring and the central adapter ring having cooperating complemental portions of V-shaped cross-sections, compressible packing between each end adapter ring and the central adapter ring and adapted to be gripped therebetween so as to be maintained in chevron shape, the cooperating complemental portions on opposite sides of said central adapter ring being reversed so that said adapter rings serve to provide two groups of reversed chevron packing at opposite sides of the central adapter ring in order to prevent passage of fluid under pressure outwardly from said chamber along the tubular member and wall of the chamber and in order to prevent leakage of air inwardly along the tubular member and wall of the chamber whenever a vacuum is created within the chamber, a thrust member for limiting outward axial movement of the outermost end adapter ring secured in fixed position within the outer portion of the housing but fitted on the tubular member for relative axial movement, an anti-friction bearing disposed within the outer end of the housing between said tubular member and said housing, said bearing including an inner race held in fixed position on the exterior of said tubular member and with which said thrust member engages, said bearing also including an outer race mounted within the housing for axial movement therewithin, tapered rollers between said inner and outer races with their wider ends inwardly and with their axes extending angularly in the direction of thrust of said thrust member toward the axis of said bearing, and a thrust member carried by the housing engaging the outer end of said outer bearing race for limiting outward movement thereof relative to the housing.

4. A swivel joint comprising a housing having a chamber for receiving fluid under pressure, a fluid-conducting member mounted within said housing for relative rotation, a packing unit surrounding said fluid-conducting member and fitting within said housing to prevent passage of fluid therebetween without interfering with the relative rotation thereof, said unit including two groups of compressible chevron packing which are reversed in order to prevent passage of fluid under pressure outwardly from said chamber along the fluid-conducting member and the wall of the chamber and in order to prevent leakage of air inwardly along such member and wall of the chamber whenever a vacuum is created within the chamber, the inner end of the packing unit being subjected to fluid pressure in said chamber, a thrust member carried by the housing for limiting outward axial movement of the packing unit relative to the housing, an anti-friction bearing disposed within the housing around said fluid-conducting member, said bearing including an inner race held in fixed position on said member and with which said thrust member engages, said bearing also including an outer race mounted within the housing for axial movement therewithin, rollers between said inner and outer races with their axes extending angularly in the direction of thrust of said thrust member toward the axis of said bearing, and a thrust member carried by the housing engaging the outer end of said outer bearing race for limiting outward movement thereof relative to the housing.

5. A swivel joint comprising a housing having a chamber for receiving fluid under pressure, a fluid-conducting member mounted within said housing for relative rotation, a packing unit surrounding said fluid-conducting member and fitting within said housing to prevent passage of fluid therebetween without interfering with the relative rotation thereof, said unit including compressible packing material and the inner end of the packing unit being subjected to fluid pressure in said chamber, a thrust member carried by the housing for limiting outward axial movement of the packing unit relative to the housing, an anti-friction bearing disposed within the housing around said fluid-conducting member, said bearing including an inner race held in fixed position on said member and with which said thrust member engages, said bearing also including an outer race mounted within the housing for axial movement therewithin, rollers between said inner and outer races with their axes extending angularly in the direction of thrust of said thrust member toward the axis of said bearing, and a thrust member carried by the housing engaging the outer end of said outer bearing race for limiting outward movement thereof relative to the housing.

EUGENE BARKER.

REFERENCES CITED

The following references are of record in the file of this patent:

UNITED STATES PATENTS

| Number | Name | Date |
| --- | --- | --- |
| 2,092,116 | Hamsen | Sept. 7, 1937 |
| 2,284,340 | Nuckles | May 26, 1942 |
| 2,343,491 | Bard | Mar. 7, 1944 |
| 2,356,351 | Phillips | Aug. 22, 1944 |
| 2,444,868 | Allen et al. | July 6, 1948 |
| 2,459,981 | Warren | Jan. 25, 1949 |